(12) United States Patent
Almana et al.

(10) Patent No.: US 11,311,866 B2
(45) Date of Patent: Apr. 26, 2022

(54) CRACKING CATALYST COMPRISING PLATINUM ENCAPSULATED IN MICROPOROUS SILICA

(71) Applicant: Saudi Arabian Oil Company, Dhahran (SA)

(72) Inventors: Noor Almana, Dhahran (SA); Lianhui Ding, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 61 days.

(21) Appl. No.: 17/004,588

(22) Filed: Aug. 27, 2020

(65) Prior Publication Data

US 2022/0062876 A1    Mar. 3, 2022

(51) Int. Cl.

| | |
|---|---|
| *B01J 29/16* | (2006.01) |
| *B01J 23/42* | (2006.01) |
| *B01J 21/08* | (2006.01) |
| *B01J 21/04* | (2006.01) |
| *B01J 35/00* | (2006.01) |
| *B01J 35/10* | (2006.01) |
| *C10G 47/20* | (2006.01) |
| *B01J 21/12* | (2006.01) |

(52) U.S. Cl.
CPC .............. *B01J 29/166* (2013.01); *B01J 21/04* (2013.01); *B01J 21/08* (2013.01); *B01J 21/12* (2013.01); *B01J 23/42* (2013.01); *B01J 35/0013* (2013.01); *B01J 35/1057* (2013.01); *C10G 47/20* (2013.01); *C10G 2300/202* (2013.01)

(58) Field of Classification Search
CPC . B01J 29/166; B01J 21/04; B01J 21/08; B01J 21/12; B01J 23/42; B01J 35/0013; B01J 35/1057; C10G 47/20; C10G 2300/202
USPC .............................................. 208/111, 111.3
See application file for complete search history.

(56) References Cited

U.S. PATENT DOCUMENTS

| | | | |
|---|---|---|---|
| 4,971,680 | A | 11/1990 | Kukes et al. |
| 10,155,219 | B2 | 12/2018 | Choi et al. |
| 10,351,781 | B2 | 7/2019 | Sinha et al. |
| 2009/0048094 | A1 | 2/2009 | Ring et al. |
| 2011/0250122 | A1 | 10/2011 | Joo et al. |
| 2015/0158018 | A1 | 6/2015 | Zhan |

FOREIGN PATENT DOCUMENTS

WO    2012122208 A1    9/2012

OTHER PUBLICATIONS

International Search Report and Written Opinion dated May 3, 2021 pertaining to International application No. PCT/US2020/058190 filed Oct. 30, 2020, 12 pages.

Almana et al., "Design of a core-shell Pt-SiO2 catalyst in a reverse microemulsion system: Distinctive Kinetics on CO oxidation at low temperature", Journal of Catalysis, vol. 340, pp. 368-375, 2016.

*Primary Examiner* — Brian A McCaig
(74) *Attorney, Agent, or Firm* — Dinsmore & Shohl LLP

(57) ABSTRACT

According to the subject matter of the present disclosure, a cracking catalyst may comprise zeolite, alumina, nickel oxide, hydrogenation metal, and a core shell Pt/SiO$_2$. The core shell Pt/SiO$_2$ may comprise a platinum nanoparticle encapsulated by a microporous SiO$_2$ layer.

13 Claims, 2 Drawing Sheets

CRACKING CATALYST COMPRISING PLATINUM ENCAPSULATED IN MICROPOROUS SILICA

TECHNICAL FIELD

The present disclosure relates to chemical compositions and more particularly to compositions useful as cracking catalysts.

BACKGROUND

Compared with the conventional steam cracking feedstocks (natural gas or naphtha), whole crude oil includes both more impurities and more polyaromatic species. Some of these polyaromatic species cannot be directly converted by steam cracking. To maximize the olefin, benzene, toluene, and xylene production in the whole crudes, the crude feedstocks not only need to be hydro-processed to remove the impurities (S, N, and metals) and convert polyaromatics, but also to further convert the heavy fraction to lighter fractions. Heavy fractions may be defined as having a boiling point greater than 540° C. Light fractions may be defined as having a boiling point less than 540° C., for example vacuum gas oil (VGO), diesel and naphtha.

Zeolite-Y is widely considered to be the one of the best hydrocracking catalysts. However, for crude oil hydroprocessing, the pore size of the conventional zeolite-Y is too small to allow the large molecules (greater than 3 nm in diameter) in the heavy oil fraction to diffuse into the active sites and thus the large molecules cannot be effectively hydrocracked. However, the large molecules can be hydrogenated on surface sites if sufficient atomic hydrogen is present.

Hydrogen spillover catalysts can produce free hydrogen atoms at one site on a catalyst and the hydrogen atoms can travel to other sites on the catalyst where they react with the large molecules in whole crude fractions that cannot enter inside the catalyst. The free hydrogen atoms can spill over to adjacent hydrogenation sites or acid sites of alumina and zeolite Y, where the large hydrocarbon molecules can be hydrogenated and cracked.

Platinum catalysts are widely regarded as the most efficient hydrogenation catalysts. However, platinum metals are rapidly poisoned by even relatively small amounts of sulfur compounds because the affinity of sulfur for the platinum surface is greater than the affinity of the target compounds, such as $H_2$. Since sulfur compounds are frequently present in petroleum compositions, sulfur tolerant platinum catalysts are desirable.

SUMMARY

Accordingly, it is desired to produce platinum based hydrogen spillover catalysts which can withstand exposure to significant levels of sulfur. Embodiments of the present disclosure meet this need by encapsulating platinum within a microporous silica shell, and further combining the encapsulated platinum with other cracking catalyst components.

According to one embodiment of the present disclosure, a cracking catalyst may comprise zeolite, alumina, hydrogenation metals (nickel oxide, $MoO_3$, $WO_3$), and a core shell $Pt/SiO_2$. The core shell $Pt/SiO_2$ may comprise a platinum nanoparticle encapsulated by a microporous $SiO_2$ layer.

Although the concepts of the present disclosure are described herein with primary reference to cracking catalysts, it is contemplated that the concepts will enjoy applicability to any catalyst.

BRIEF DESCRIPTION OF THE SEVERAL VIEWS OF THE DRAWINGS

The following detailed description of specific embodiments of the present disclosure can be best understood when read in conjunction with the following drawings.

ABBREVIATIONS

° C./min.=degrees Celsius per minute.
° C.=degrees Celsius.
Pt=platinum.
$SiO_2$=silicon dioxide.
$H_2S$=hydrogen sulfide.
$H_2$=hydrogen.
H=hydrogen atoms.
TEM=transmission electron microscopy.
ml/g=milliliters per gram.
$m^2/g$=square meters per gram.
nm=nanometers.
USY=ultra-stable zeolite Y.

DETAILED DESCRIPTION

Figure 1:
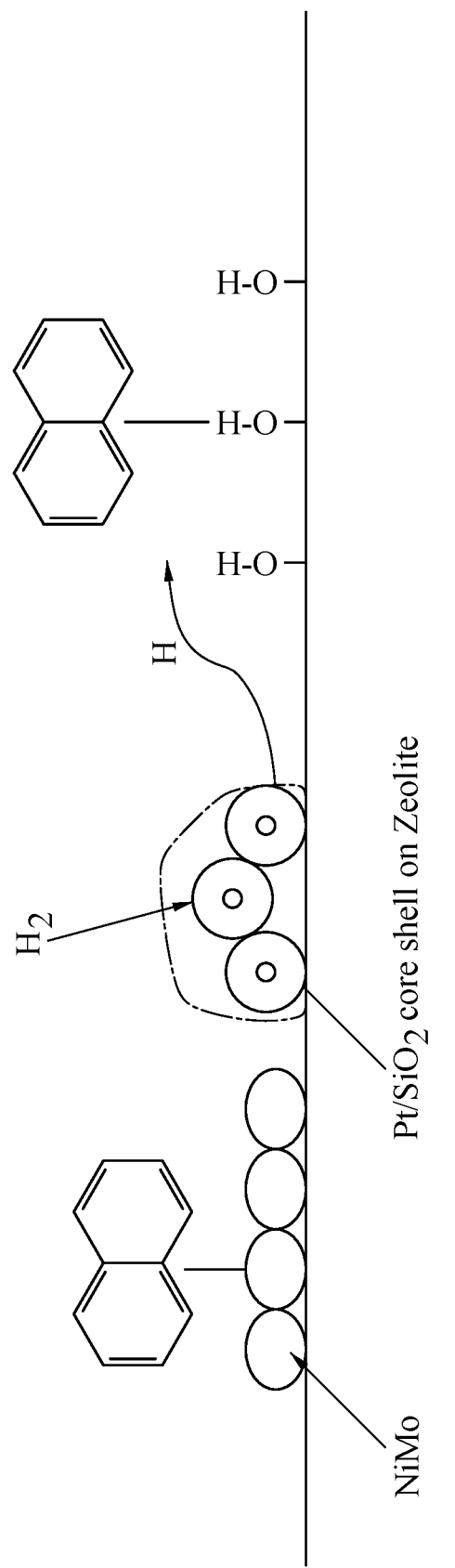
FIG. 1 shows the function of a $Pt/SiO_2$ hydrogen spillover catalyst on the surface of a zeolite.

Embodiments of the present disclosure are directed to sulfur tolerant cracking catalysts which incorporate a platinum catalyst encapsulated within a molecular sieve. If the molecular sieve is properly designed, $H_2$ and H can pass through the sieve but sulfur compounds, such as $H_2S$ cannot. The hydrogen may be introduced to the reactor as a gas or produced in the reactor though a reaction, such as the water-gas shift reaction. As shown in FIG. 1, the H can then spillover to the surrounding catalytic sites.

A cracking catalyst may comprise zeolite, alumina, nickel oxide, hydrogenation metals, and a core shell Pt/microporous $SiO_2$. There are believed to be significant synergistic effects between the components of the cracking catalyst. Specifically, the close proximity between the core shell $Pt/SiO_2$ and the other cracking catalyst components may enable hydrogen atoms to be produced at the Pt surface and "spillover" to the other cracking catalyst components.

As used herein, a "zeolite" refers to a microporous, crystallized aluminosilicate material. Zeolites of the present disclosure may include ultrastable-y (USY) (available commercially as CBV-760 from Zeolyst), ZSM-5, zeolite-beta, Y-zeolite, zeolite-A, mordenite, or a combination of these. The zeolite may be synthetic or natural. According to specific embodiments, the zeolite may comprise ultra-stable zeolite Y (USY). USY is believed to be a suitable zeolite choice because it has appropriate pore sizes, high acidity, good thermal and hydrothermal stability. In some circumstances, the pore sizes of zeolite A and mordenite may be too small to convert heavy oil fractions, vacuum gas oil, or diesel fractions.

As used herein, "alumina" refers to an aluminum oxide ($Al_2O_3$) composition. The alumina of the present disclosure may be a large-pore alumina (commercially available as Sasol PURALOX TH100/150).

The large-pore alumina may have a pore volume of from 0.7 ml/g to 1.2 ml/g. For example, the large-pore alumina may have a pore volume of from 0.8 ml/g to 1.1 ml/g, or from 0.9 ml/g to 1.0 ml/g, or from 0.95 ml/g to 1.0 ml/g. The pore volume of the large-pore alumina may be measured from the maximum adsorption of nitrogen during BET analysis.

The large-pore alumina may have a specific surface area of from 150 m$^2$/g to 250 m$^2$/g. For example, the large-pore alumina may have a specific surface area of from 175 m$^2$/g to 225 m$^2$/g, or from 200 m$^2$/g to 210 m$^2$/g. The specific surface area may be measured through BET analysis.

Without being limited by theory, hydrocracking catalysts may be bi-functional catalysts, having both a cracking function and a hydrogenation function. The cracking function may be provided by cracking components, such as zeolite and alumina. The hydrogenation function may be provided hydrogenation metals. The hydrogenation metal may refer to any metal oxide suitable for hydrogenating hydrocarbon molecules. For example, the hydrogenation metals may be one or more of NiO, MoO$_3$, or WO$_3$. The hydrogenation metals may be added to cracking components by mixing or impregnation. For example, one or more of a nickel nitrate, a tungsten precursor, or a molybdenum precursor may be introduced to the other catalytic materials by mixing, and may be converted to an oxide in situ by calcination. Alternatively, one or more of NiO, MoO$_3$, or WO$_3$ may be introduced to the other catalytic materials by mixing.

The core shell Pt/SiO$_2$ may comprise a platinum nanoparticle encapsulated by a microporous SiO$_2$ layer. The platinum nanoparticle may be fully or partially encapsulated by the microporous SiO$_2$ layer. As used herein, "microporous" may refer to a pore size less than 2 nm.

An average pore size of the microporous SiO$_2$ layer may be from 0.25 nm to 1.5 nm. For example, the average pore size of the microporous SiO$_2$ layer may be from 0.5 nm to 1.4 nm, or from 0.75 nm to 1.4 nm, or from 1.0 nm to 1.4 nm, or from 1.25 nm to 1.4 nm, or from 1.3 nm to 1.5 nm, or any subset thereof.

The surface area may be calculated by BET analysis and with the multipoint BET equation. Pore volume may be calculated from the maximum adsorption amount of nitrogen. The pore size distribution may be determined based on the Barrett-Joyner-Halenda (BJH) method and the desorption branch of the isotherm. The average pore sizes may be calculated by the equation Ps=4V/S, where Ps=pore size, V=pore volume, and S=surface area.

A maximum pore size of the microporous SiO$_2$ layer may be 1.5 nm. For example, the maximum pore size of the microporous SiO$_2$ layer may be less than 1.45 nm, less than 1.4 nm, less than 1.3 nm, less than 1.2 nm, less than 1.1 nm, less than 1.0 nm, less than 0.9 nm, less than 0.75 nm, less than 0.5 nm, or any subset thereof. Maximum pore size may be calculated using density functional theory (DFT) and a N2 physisorption analysis.

The microporous SiO$_2$ layer may have an average thickness of from 6 nm to 10 nm. For example, the microporous SiO$_2$ layer may have an average thickness of from 6 nm to 8 nm, or from 6 nm to 7 nm, or from 7 nm to 10 nm, or from 7 nm to 9 nm, or from 8 nm to 10 nm, or from 8 nm to 9 nm, or any subset thereof. The average thickness of the SiO$_2$ layer may be measured using TEM.

The microporous SiO$_2$ layer may have a maximum thickness and a minimum thickness. The maximum thickness may be less than 4 nm greater than the minimum thickness. For example, the difference between the maximum thickness and minimum thickness may be less than 3 nm, less than 2 nm, or even less than 1 nm. Without being limited by theory, it is believed that consistent thickness of the microporous SiO$_2$ layer will lead to improved catalytic performance because a well-defined, uniform, and homogenous SiO$_2$ layer is believed to be more effective at excluding H$_2$S molecules than a less uniform layer would be.

The Pt nanoparticle may be from 0.5 nm to 6 nm in diameter. For example, the Pt nanoparticle may be from 0.5 nm to 5 nm, or from 0.5 nm to 4 nm, or from 0.5 nm to 2 nm, or from 0.5 nm to 1 nm, or from 1 nm to 6 nm, or from 1 nm to 4 nm, or from 1 nm to 3 nm, or from 2 nm to 6 nm, or from 2 nm to 4 nm, or from 3 nm to 6 nm, or from 3 nm to 5 nm, or any subset thereof. The diameter of the Pt nanoparticle may be measured using TEM. If the diameter of the nanoparticle is not completely round, an average of measurements should be taken.

The core shell Pt/microporous SiO$_2$ may be produced by preparing a first solution and a second solution, each comprising surfactant, water, and cyclohexane. The surfactant:cyclohexane ratio may be from 1:10 to 1:15, 1:10 to 1:20, 1:15 to 1:20, or any subset thereof. The surfactant:water ratio may be from 1:2 to 1:5, 1:2 to 1:10, 1:5 to 1:10.

The first solution may further comprise a platinum precursor. The platinum precursor may be any chemical capable of forming platinum in solution, such as ammonium platinum chloride ((NH$_4$)$_2$PtCl$_4$ or platinum nitrate (PtNO$_3$).

A second solution may further comprise from 10 wt. % to 50 wt. % aqueous ammonia. For example, the second solution may comprise from 10 wt. % to 30 wt. %, from 20 wt. % to 50 wt. %, from 20 wt. % to 30 wt. %, or any subset thereof, of aqueous ammonia. The first solution and the second solution may be mixed to form a third solution. The third solution may be allowed to rest for 1 day to 4 days. For example, the third solution may be allowed to rest for from 1 day to 3 days, 2 days to 4 days, or any subset thereof.

A structure directing agent may be added to the third solution. For example, the structure directing agent may be tetraethyl orthosilicate (TEOS) or tetramethyl orthosilicate (TMOS). The third solution which comprises the structure directing agent may then be stirred for from 1 day to 5 days. For example, the third solution comprising the structure directing agent may be stirred for from 1 day to 3 days, 2 days to 5 days, or any subset thereof. After stirring, the third solution may be centrifuged to separate particulates and washed with ethanol.

The particulates may be dried. For example, the particulates may be dried at from 100° C. to 120° C. for from 6 hours to 18 hours. The dried particulates may be calcined at from 200° C. to 600° C. The particulates may be calcined for a specified period of time. Alternatively, the particulates may be calcined at a specific ramp rate. For example, the particulates may be calcined at a ramp rate of from 1° C./minute to 10° C./minute. As used herein, "ramp rate" means that the temperature is increased by a set number of degrees per minute.

According to some embodiments, the hydrogenation metal may comprise W03. According to such embodiments, the catalyst may comprise from 20 wt. % to 26 wt. %, from 22 wt. % to 26 wt. %, from 24 wt. % to 26 wt. %, from 20 wt. % to 24 wt. %, from 22 wt. % to 24 wt. % or any subset thereof, of W03. The catalyst may further comprise from 4 wt. % to 6 wt. %, from 4.5 wt. % to 5.5 wt. %, from 4 wt. % to 5 wt. %, or from 5 wt. % to 6 wt. % NiO. The catalyst may further comprise from 10 wt. % to 60 wt. %, from 20 wt. % to 60 wt. %, from 30 wt. % to 60 wt. %, from 40 wt. % to 60 wt. %, from 10 wt. % to 50 wt. %, from 10 wt. % to 40 wt. %, from 10 wt. % to 30 wt. %, from 20 wt. % to 50 wt. %, from 30 wt. % to 40 wt. %, or any subset thereof, of zeolite. The catalyst may further comprise from 1 wt. % to 10 wt. %, from 1 wt. % to 7 wt. %, from 1 wt. % to 5 wt. %, from 3 wt. % to 10 wt. %, from 5 wt. % to 10 wt. %, from 3 wt. % to 7 wt. %, or any subset thereof of the core shell Pt/SiO$_2$. The catalyst may further comprise from 10 wt. % to 60 wt. %, from 20 wt. % to 60 wt. %, from 30 wt. % to 60 wt. %, from 40 wt. % to 60 wt. %, from 10 wt. % to 50 wt. %, from 10 wt. % to 40 wt. %, from 10 wt. % to 30 wt. %, from 20 wt. % to 50 wt. %, from 30 wt. % to 40 wt. %, or any subset thereof, of alumina.

According to further embodiments, the hydrogenation metal may comprise MoO$_3$. According to such embodiments, the catalyst may comprise from 14 wt. % to 16 wt. %, or from 14.5 wt. % to 15.5 wt. % MoO$_3$. The catalyst may further comprise from 4 wt. % to 6 wt. %, from 4.5 wt. % to 5.5 wt. %, from 4 wt. % to 5 wt. %, or from 5 wt. % to 6 wt. % NiO. The catalyst may further comprise from 10 wt. % to 50 wt. %, from 20 wt. % to 50 wt. %, from 30 wt. % to 50 wt. %, from 40 wt. % to 50 wt. %, from 10 wt. % to 40 wt. %, from 10 wt. % to 30 wt. %, from 10 wt. % to 20 wt. %, from 20 wt. % to 50 wt. %, from 30 wt. % to 40 wt. %, or any subset thereof, of zeolite. The catalyst may further comprise from 1 wt. % to 10 wt. %, from 1 wt. % to 7 wt. %, from 1 wt. % to 5 wt. %, from 3 wt. % to 10 wt. %, from 5 wt. % to 10 wt. %, from 3 wt. % to 7 wt. %, or any subset thereof of the core shell Pt/SiO$_2$. The catalyst may further comprise from 20 wt. % to 60 wt. %, from 30 wt. % to 70 wt. %, from 40 wt. % to 70 wt. %, from 10 wt. % to 50 wt. %, from 10 wt. % to 40 wt. %, from 10 wt. % to 30 wt. %, from 20 wt. % to 50 wt. %, from 30 wt. % to 40 wt. %, or any subset thereof, of alumina.

The cracking catalyst may further comprise a binder. The binder may be to any substance capable of holding the cracking catalyst components together. The binder may comprise one or more of a clay, a mineral, an alumina, or a silica. The clay may comprise kaolin. The alumina may comprise one or more of attapulgite, boehmite, or partially acid-peptized alumina. According to some specific embodiments, the binder may comprise a partially acid-peptized alumina.

A partially acid-peptized alumina may be prepared by mixing a small pore alumina with HNO$_3$. The pore volume of the small pore alumina may be from 0.4 ml/g to 0.6 ml/g. The HNO$_3$/alumina molar ratio may be from 0.2 to 0.3.

A method of using the cracking catalyst may comprise exposing the cracking catalyst to hydrocarbon feed for from 2 hours to 10 hours. The hydrocarbon feed may comprise H$_2$ gas, at least 5 wt. % of aromatic compounds, and at least 5 ppm of H$_2$S.

The cracking catalyst may be exposed to the hydrocarbon feed in a chemical reactor. For example, the chemical reactor may be a fixed bed reactor, fluidized bed reactor, a tank reactor, a conventional catalyst bed, or any other chemical reactor suitable for contacting a catalyst with a substrate.

The hydrocarbon feed may comprise H$_2$ gas. The hydrogen gas may have been generated in situ (within the reactor) or outside the reactor and pumped in.

The cracking catalyst may be exposed to the hydrocarbon feed at a temperature of between 350° C. and 400° C. Without being limited by theory, it is believed that at low temperature (less than 350° C.), the cracking reactions may be controlled by kinetics and thus too slow. At high temperatures (greater than 400° C.), the cracking reactions may controlled by thermodynamics and are thus faster. However, above a critical temperature, the dehydrogenation reactions may be faster than hydrogenation reactions. Thus, above that critical temperature, it is believed that the polyaromatics in the heavy oils cannot be converted to desired products and they will instead become coke. This coke will accelerate the catalyst deactivation process.

The cracking catalyst may be exposed to the hydrocarbon feed for a period greater than 4 hours. For example, the cracking catalyst may be exposed to the hydrocarbon feed for a period greater than 6 hours, greater than 8 hours, greater than 12 hours, or even greater than 24 hours. It should be understood that the residence time of the hydrocarbon feed need not be greater than the specified period of time, only that the cracking catalyst is exposed to a portion of feed for that long.

The hydrocarbon feed may comprise at least 5 wt. % of aromatic compounds. For example, the hydrocarbon feed may comprise at least 10 wt. %, at least 15 wt. %, or at least 20 wt. % of aromatic compounds.

The hydrocarbon feed may comprise at least 5 ppm of sulfur compounds. The sulfur compounds may include one or more of H$_2$S and organic sulfur compounds. The organic sulfur compounds may include one or more of mercaptans (thiols), thiophene, and dibenzothiophene. For example, the hydrocarbon feed may comprise at least 100 ppm, 200 ppm, 300 ppm, 500 ppm, or even 1000 ppm of the sulfur compounds. It is believed that a conventional platinum catalyst would be quickly deactivated in such an environment. However, it is further believed that the present catalyst would be suitable for use in such an environment.

A conversion of the aromatic compounds may decline by less than 5 percentage points over the first 4 hours of exposure to the hydrocarbon feed. For example, the conversion of aromatic compounds may decline by less than 3 percentage points, or less than 2 percentage points, or even by less than 1 percentage point, over the first 4 hours of exposure to the hydrocarbon feed. Additionally, the conversion of aromatic compounds may decline by less than 3 percentage points, or less than 2 percentage points, or even by less than 1 percentage point, over the first 8 hours of exposure to the hydrocarbon feed.

Substantially all of the H$_2$S may be unable to contact the platinum nanoparticle and at least a portion of the H$_2$ gas may be able to contact the platinum nanoparticle. Specifically, less than 10 mol. %, less than 5 mol. %, less than 1 mol. %, or even less than 0.1 mol. % of the H$_2$S which contacts the surface of the SiO$_2$ may be unable to contact the platinum nanoparticle. For example, greater than 10 wt. %, greater than 20 wt. %, greater than 30 wt. %, greater than 50 wt. %, or even greater than 75 wt. % of the hydrogen which contacts the surface of the SiO$_2$ may be able to contact the platinum nanoparticle.

As used herein a "percentage point" difference refers to the arithmetic difference between two percentages. For example, a change from 4 wt. % to 2 wt. % would be both a 50% decrease and a decrease of two percentage points.

EXAMPLES

Example 1

The core shell Pt/SiO$_2$ nanoparticles were prepared by a reverse micro-emulsion method. The following synthesis protocol was used to create samples NM-1, NM-2, and NM-3. Specific quantities of reagent and characterization of products is provided below in Table 1.

Two solutions of equal volume were prepared, each of which included surfactant/water/cyclohexane in the ratios 1/(2 to 10)/(10 to 20). The surfactant was polyoxyethylene (5) nonylphenyl ether with 5 oxyethylene per molecule (also known as NP5 and available commercially as IGEPAL® CO-520 from Sigma Aldrich). Solution I further comprised an aqueous solution of $(NH_4)_2PtCl_4$. Specifically, Solution I was prepared by dissolving 86.3 mg or 256 µmol of platinum (IV) chloride in 3.5 ml of water. Solution II further comprised 3.5 ml of ammonia/(ammonium hydroxide solution (28% $NH_3$ in H2O). Solutions I and II were mixed to form solution III. Solution III was allowed to sit for two days, after which 1.2 ml of TEOS was added to solution 3. The resulting solution was stirred for three more days. The particulates were separated by centrifuging and were washed three times with ethanol. The resulting product was dried at 100° C. to 120° C. overnight. The dried product was then calcined at 200° C. to 600° C. with a ramping rate of 1° C./min. to 10° C./min.

TABLE 1

| Sample name | NM-1 | NM-2 | NM-3 |
|---|---|---|---|
| Synthesis Molar Ratio | | | |
| $NH_4OH$ (aq) | 4 | 4 | 4 |
| Surfactant | 1 | 1 | 1 |
| Cyclohexane | 17 | 17 | 17 |
| $H_2O$ | 4 | 4 | 4 |
| $PtCl_4$ | 1 | 1 | 1 |
| $SiO_2$ Source | 5 | 10 | 20 |
| XRD Results | Pt face-centered cubic (fcc) structure | Pt face-centered cubic (fcc) structure | Pt face-centered cubic (fcc) structure |
| Pt Crystallite Size (nm) | 5 | 5 | 5 |
| Pt Particle Size TEM (nm) | 4-5 | 4-5 | 4-5 |
| $SiO_2$ Shell Thickness | 6 | 7 | 20 |
| Pt Dispersion % (TEM) | 22 | | |
| Pt Dispersion % (CO Chemsorption) | | | 26 |
| BET Surface Area After Calcination at 500° C. ($m^2/g$) | | | 105 |

Table 1 shows that increased $SiO_2$ source content results in increased $SiO_2$ shell thickness. Additionally, varying the $SiO_2$ shell thickness did not alter the size of the core Pt nanoparticles.

Characterization by X-ray diffraction (XRD) data revealed peaks located at 2θ=39.7, 46, and 67.6 correspond to the (111), (200), and (220) Pt crystal planes, respectively, for the face-centered cubic (fcc) structure. The average crystallite size of the Pt nanoparticles was estimated from (111) diffraction using Scherrer's equation.

Figure 2A:
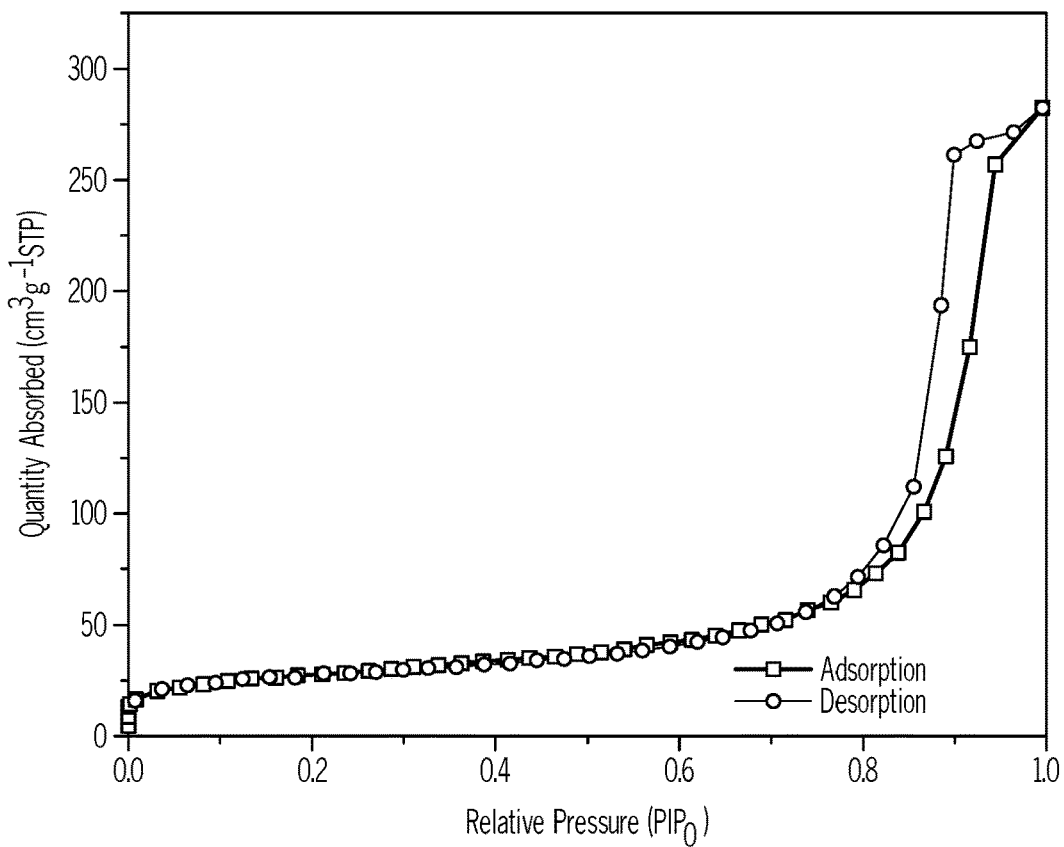
FIG. 2A shows a nitrogen isotherm of sample NM-3.
Figure 2B:
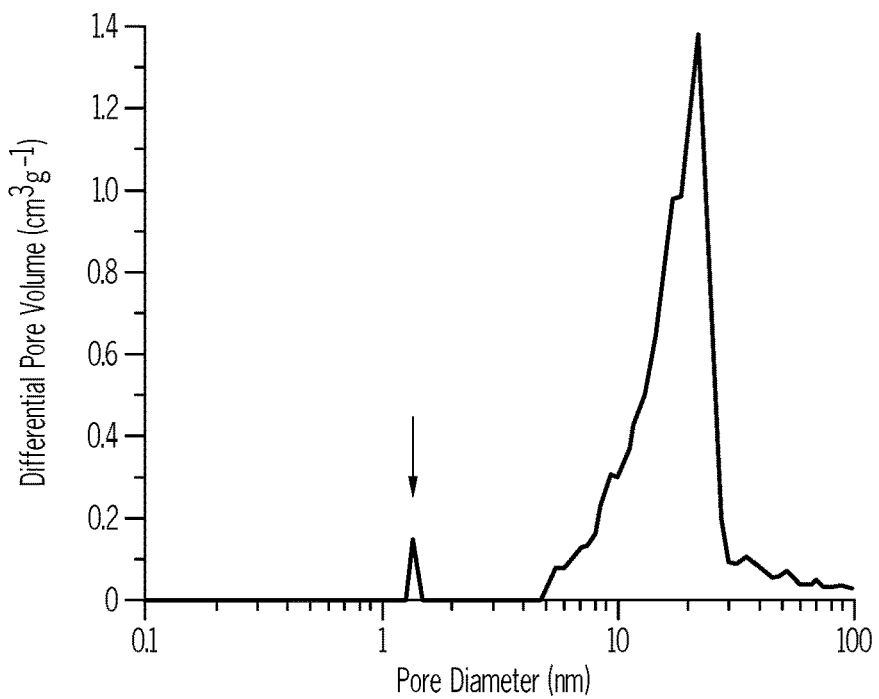
FIG. 2B shows a pore size distribution of sample NM-3.

FIG. 2A shows a representative N2 isotherm for the $Pt/SiO_2$ (NM-3) sample. FIG. 2B shows the relative pore size distribution. The mesoporous nature (6 nm to 30 nm) is assigned to interparticle voids. The presence of the microporous feature for the structure (~1.4 nm) can be seen the N2 isotherm results, which may provide gas-permeation capability to the metal core through the shell layer.

Catalyst Preparation

Inventive Example 1

A sample catalyst designated INVENTIVE EXAMPLE 1 was prepared from the silica encapsulated platinum of NM-3 and USY zeolite (CBV-760 from Zeolyst). The NM-3 and USY were mixed with large-pore alumina, $MoO_3$, nickel nitrate hexahydrate, and binder. The mixture was extruded to form a cylindrically shaped extrudate, dried at 383 K overnight, and then calcined in air at 773 K for 4 h. The composition of INVENTIVE EXAMPLE 1 is summarized in Table 2.

Comparative Example 1

A sample catalyst designated COMPARATIVE EXAMPLE 1 was prepared without the silica encapsulated platinum of NM-3. USY zeolite was mixed with large-pore alumina, $MoO_3$, nickel nitrate hexahydrate, and binder. The mixture was extruded to form a cylindrically shaped extrudate, dried at 383 K overnight, and then calcined in air at 773 K for 4 h. The composition of COMPARATIVE EXAMPLE 1 is summarized in Table 2.

Comparative Example 2

A second sample catalyst designated COMPARATIVE EXAMPLE 2 was prepared without the silica encapsulated platinum of NM-3. Rather, this sample used a platinum nanoparticle supported on, but not encapsulated by silicon oxide ($SiO_2$). The sample was prepared by mixing the platinum/$SiO_2$, USY zeolite, large-pore alumina, $MoO_3$, nickel nitrate hexahydrate, and binder. The mixture was extruded to form a cylindrically shaped extrudate, dried at 383 K overnight, and then calcined in air at 773 K for 4 h. The composition of the COMPARATIVE EXAMPLE 2 is summarized in Table 2.

To synthesize the supported $Pt/SiO_2$, solutions I and II were prepared as above. However, 1.2 ml of TEOS was added to solution II, solution II was then stirred for three days, allowing $SiO_2$ spheres to form. Solutions I and II were then mixed and allowed to stir overnight, causing the formation of $SiO_2$ supported Pt nanoparticles. It should be understood that the Pt nanoparticles were supported on, and not encapsulated by, $SiO_2$.

The large-pore alumina used in all three examples was Sasol PURALOX TH100/150 with a pore volume of 0.96 mL/g and specific surface area of 201.6 $m^2/g$. The binder was partially acid-peptized alumina (SASOL, CATAPAL B).

TABLE 2

| | INVENTIVE EXAMPLE 1 | COMPARATIVE EXAMPLE 1 | COMPARATIVE EXAMPLE 2 |
|---|---|---|---|
| $MoO_3$ (wt. %) | 15 | 15 | 15 |
| NiO (wt. %) | 5 | 5 | 5 |
| USY (wt. %) | 40 | 50 | 40 |
| NM-3 (wt. %) | 10 | 0 | 0 |
| $Pt/SiO_2$ (wt. %) | 0 | 0 | 10 |
| $Al_2O_3$ (wt. %) | 30 | 30 | 30 |

Catalyst performance tests were carried out in a 5 ml fixed-bed microreactor. 3 ml of 20 mesh to 40 mesh catalyst was diluted with 100 mesh sand of the same volume. Before each run, the catalysts were pre-sulfided in situ. Here, 1-methylnaphthlene (MN) comprising 20 wt. % hexadecane was used as the model compound. The tests were run at reaction temperature=350° C., $H_2$ pressure=220 psig, LHSV=2.0 $h^{-1}$, and $H_2$/MN volume ratio=1000:1. In order to test the sulfur resistance of $Pt/SiO_2$, an amount of DMDS (equivalent to 20 ppm $H_2S$) was added to the reactor along with the 1-MN, as is shown in Table 3. Data was collected after 8 hours of operation.

TABLE 3

| Catalyst | INVENTIVE EXAMPLE 1 | | COMPARATIVE EXAMPLE 1 | COMPARATIVE EXAMPLE 2 | |
|---|---|---|---|---|---|
| H2S, ppm | 0 | 20 | 0 | 0 | 20 |
| 1-MN conversion (wt. %) | 87.2 | 82.1 | 61.4 | 85.8 | 53.2 |
| Product distribution (wt. %) | | | | | |
| Methyl-butyl benzene | 22.6 | 20.8 | 10.7 | 22.3 | 10.1 |
| Pentylbenzene | 23.1 | 22.5 | 11.9 | 22.9 | 12.4 |
| Methyl tetrahydronaphthalene | 41.5 | 38.8 | 39 | 40.6 | 30.7 |
| 1-MN | 12.8 | 17.9 | 38.6 | 14.2 | 46.8 |

Compared with the COMPARATIVE EXAMPLE 1, the addition of the Pt/SiO$_2$ to INVENTIVE EXAMPLE 1 resulted in a 24 percentage point increase in 1-MN conversion.

As is shown by the comparison between COMPARATIVE EXAMPLE 2 AND INVENTIVE EXAMPLE 1, in the absence of H$_2$S, the catalyst with un-encapsulated Pt had slightly lower conversion, and a similar product distribution. However, in the presence of 20 ppm H$_2$S, the catalyst with un-encapsulated Pt experienced a 32 percentage point decrease in conversion. This conversion is believed to be caused by sulfur poisoning of the platinum catalyst. In contrast, the encapsulated Pt/SiO$_2$ catalyst of INVENTIVE EXAMPLE 1 experienced only a 5 percentage point decrease in conversion.

It is also noted that recitations herein of "at least one" component, element, etc., should not be used to create an inference that the alternative use of the articles "a" or "an" should be limited to a single component, element, etc.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A cracking catalyst comprising zeolite, alumina, nickel oxide, a hydrogenation metal, and a core shell Pt/SiO$_2$, wherein the core shell Pt/SiO$_2$ comprises a platinum nanoparticle encapsulated by a microporous SiO$_2$ layer.

2. The cracking catalyst of claim 1, wherein an average pore size of the microporous SiO$_2$ layer is from 0.25 nm to 1.5 nm.

3. The cracking catalyst of claim 2, wherein a maximum pore size of the microporous SiO$_2$ layer is 1.5 nm.

4. The cracking catalyst of claim 1, wherein the microporous SiO$_2$ layer has an average thickness of 6 nm to 10 nm.

5. The cracking catalyst of claim 4, wherein the microporous SiO$_2$ layer has a maximum thickness and a minimum thickness, the maximum thickness is less than 4 nm greater than the minimum thickness.

6. The cracking catalyst of claim 1, wherein the Pt nanoparticle is from 0.5 nm to 6 nm in diameter.

7. The cracking catalyst of claim 1, wherein the hydrogenation metal is one or both of MoO$_3$ and WO$_3$.

8. The cracking catalyst of claim 1, wherein the hydrogenation metal comprises WO$_3$ and the catalyst comprises from 20 wt. % to 26 wt. % WO$_3$, from 4 wt. % to 6 wt. % NiO, from 10 wt. % to 60 wt. % zeolite, from 1 wt. % to 10 wt. % core shell Pt/SiO$_2$, and from 10 wt. % to 60 wt. % alumina.

9. The cracking catalyst of claim 1, wherein the hydrogenation metal comprises MoO$_3$ and the catalyst comprises from 14 wt. % to 16 wt. % MoO$_3$, from 4 wt. % to 6 wt. % NiO, from 10 wt. % to 50 wt. % zeolite, from 1 wt. % to 10 wt. % core shell Pt/Sift, and from 20 wt. % to 70 wt. % alumina.

10. The cracking catalyst of claim 1, wherein the zeolite comprises ultra-stable zeolite Y (USY).

11. A method of using the cracking catalyst of claim 1, the method comprising exposing the cracking catalyst to hydrocarbon feed for a period greater than 4 hours, the hydrocarbon feed comprises H$_2$ gas, at least 5 wt. % of aromatic compounds, and at least 5 ppm of H$_2$S.

12. The method of using a cracking catalyst of claim 11, wherein a conversion of the aromatic compounds declines by less than 5 percentage points over the first 4 hours of exposure to the hydrocarbon feed.

13. The method of using a cracking catalyst of claim 11, wherein substantially all of the H$_2$S is unable to contact the platinum nanoparticle and at least a portion of the H$_2$ gas is able to contact the platinum nanoparticle.

* * * * *